United States Patent Office 3,213,041
Patented Oct. 19, 1965

3,213,041
PROCESS OF PYROLYZING A PARA-XYLYL HALIDE
Herbert Max Emil Steiner, Altrincham, and Alec Norman Roper, Eccles, England, assignors to The M. W. Kellogg Company, Jersey City, N.J., a corporation of Delaware
No Drawing. Filed July 5, 1957, Ser. No. 669,932
1 Claim. (Cl. 260—2)

This invention relates to a novel and useful condensation product of improved properties and to a method for the preparation thereof. In one aspect this invention relates to a novel and improved process for reacting an aromatic xylyl halide to produce a moldable polymer. In another aspect this invention relates to the preparation of a polymer containing an aromatically unsaturated nucleus and having improved properties. In another aspect this invention relates to an improved process for the preparation of para-xylylene polymer containing a minor amount of a chlorinated compound.

It is known that certain polymers which contain aromatically unsaturated nuclei such as poly-p-xylylene have desirable properties which make them valuable as electrical insulators and as protective coatings which have high heat stability, extraordinary resistance to various corrosive liquids, and excellent impermeability to common organic solvents. However, it has been necessary to employ extremely high temperatures, for example, temperatures in excess of 1000° C. in order to prepare the monomers of these polymers in good yield and selectivity. Thus, the polymers while having commercially desirable properties are expensive to produce. In spite of the valuable characteristics of these polymers their application in industry has been somewhat limited as a result of the cost of preparing them and also because of certain less desirable properties which they possess such as their non-flexibility and the difficulty in molding them except at temperatures ranging between about 350° C. and about 450° C.

It is, therefore, an object of the present invention to provide a new and improved polymer containing aromatically unsaturated nuclei and a process for the preparation thereof.

Another object of this invention is to provide a commercially feasible process for producing in high yield and selectivity an improved aromatically unsaturated polymer containing a minor proportion of a halogen chemically combined therein.

Another object of this invention is to provide a process for the preparation of a valuable polymer containing an aromatically unsaturated cyclic nucleus, which polymer can be molded into a variety of useful articles at relatively low temperatures and which have good heat stability and electrical properties.

Another object is to provide a polymer of the pyrolysis product of a p-xylyl halide.

Various other objects and advantages of the present invention will become apparent to those skilled in the art from the accompanying description and disclosure.

According to this invention a p-xylyl halide is pyrolyzed at an elevated temperature and the resulting vaporous product is condensed to produce an aromatically unsaturated polymer in substantially high yield and good selectivity, said polymer having a minor proportion of a halogen chemically combined therein. The process of this invention is effected by reacting or pyrolyzing the xylyl halide at a temperature between about 500° C. and 1000° C., for a period or residence time in the reaction zone of not more than 10 seconds and condensing out the resulting polymer at a low temperature, for example, at a temperature not in excess of 30° C.

The xylyl halide used in the process of the present invention is an aromatic compound having a benzene ring wherein two of the ring carbon atoms in the 1,4-positions are substituted with substituents other than hydrogen, and wherein one of these ring carbon atoms is singly bonded to a methyl radical and the other ring carbon atom is singly bonded to a methyl halide radical.

The halide may be a chloride, bromide or iodide and the preferred xylyl halide is para-xylyl chloride. The para-xylyl halide which can be prepared by the halogenation of paraxylene under conditions favoring side chain halogenation, such as, for example, at elevated temperatures under U.V. irradiation or by any other method, is washed, dried and fractionated to remove all unreacted xylene and higher halogenated compounds and to assure the reaction of pure xylyl mono halide in the pyrolysis step of the process of the invention.

The term "halide" as used in this specification and in the claims includes the chloride, bromide and iodide but not the fluoride. Similarly, the term "halogen" includes chlorine, bromine and iodine, but not fluorine.

The residence time in the reaction zone most suitable for use in the pyrolysis step of the process of the present invention depends largely on the temperature at which the pyrolysis is carried out. It has been found that the higher the temperature, the shorter is the residence time required to obtain optimum conversion and to reduce the loss of starting material not converted to the desired products.

The operative temperature range for the pyrolysis of a para-xylyl halide is greatly reduced as compared with the pyrolysis temperature required for para-xylene (900° C. to about 1300° C.) to obtain a given amount of product. The pyrolysis temperature required for the xylyl halide is between about 500° C. and about 1000° C. and preferably within the range of about 700° C. and below 900° C. The residence time is less than 10 seconds even at 500° C. while within the preferred temperature range the residence time is between about 0.2 and about 0.001 second.

The pyrolysis step is generally carried out in a tube or in a bank of tubes which may be heated electrically or by combustion. In the case of very short pyrolysis times, a heated grid may be used instead of a tube or tubes. Electrical heating is best accomplished by surrounding the individual pyrolysis tubes with resistant electrical heating elements. Combustion heating is best accomplished by surrounding the entire bank of tubes in a controlled combustion oven.

To avoid excessive cracking, it is preferred that the pyrolysis be conducted at sub-atmospheric pressures. For best results the aromatic vapors should be present at partial pressures not substantially higher than 150 mm. Hg absolute. Excellent results are obtained when the partial pressure of the aromatic compound is 10 mm. Hg absolute or somewhat below. The pyrolysis can be conducted in the presence of an inert gas, such, for example, as carbon dioxide, steam or nitrogen, particularly when the partial pressure of the aromatic hydrocarbon is 10 mm. Hg absolute or below. In such cases the total pressure employed should be below 400 mm. Hg absolute. The preferred diluent is steam as this possesses the advantage that the large volume of hydrogen halide liberated in the pyrolysis step is absorbed to a large extent by the water formed as the steam condenses. This assists in the maintenance of a low pressure in the system, reduces the pumping capacity required and suppresses undesirable side reactions.

After the xylyl halide has been reacted at the desired temperature for a desired residence time, the vapors are cooled to a temperature of at least 30° C. or below. The vapors of the reaction are preferably cooled to a temperature of about −45° C. or below and are most preferably cooled to a temperature between about −45° C. and about that of liquid nitrogen (−195.8° C.). The polymer products of the reaction are formed spontaneously upon cooling and may be collected at temperatures as high as 200° C.; however, at this upper limit only low molecular weight polymers are obtained. It is, therefore, desirable to cool the vapors to at least a temperature of 30° C. before collecting the polymer.

These polymers are preferably produced in the vapor phase by allowing the pyrolyzed vapors to polymerize as they are cooled in a trap after leaving the pyrolysis zone. The trap may be cooled to room temperature but is preferably cooled to a temperature below room temperature with a suitable cooling medium such as, for example, a bath of acetone and Dry Ice, liquid nitrogen or any other cooling medium such as cyclohexane which is maintained at a sufficiently low temperature below about 30° C. Unreacted xylyl halide, and also water if steam has been used as diluent, condense in admixture with the polymer when the vapors are thus cooled. Separation of xylyl halide and water from the polymer is readily effected by removal of the total mass from the condensing system, followed by pressing on a filter and extraction with suitable solvents.

It is also within the scope of this invention to polymerize the pyrolyzed vapors in the liquid phase. This method comprises quickly quenching the vapors as they leave the pyrolysis zone in a quenching liquid maintained at the desired polymerization temperature or below the temperature at which rapid polymerization in solution takes place, that is, at a temperature below −45° C. and preferably below −80° C. Suitable liquids used for quenching may be any of the compositions which remain liquid in the necessary temperature range and which have a relatively low partial pressure, consistent with the upper total pressure limit of 400 mm. Hg and preferably low enough to permit operation below about 10 mm. Hg. The liquid should also be substantially non-reactive with the compounds formed, although liquids, which react to some slight degree with the compounds formed, may be used. Among the specific liquids which may be used are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloro ethyl benzene, o-fluoro toluene and 1,1-dichloroethane; carbonyl compounds of low freezing point, such as ethyl acetate, methyl isobutyrate, isobutyl formate, acetone, methyl ethyl ketone and methyl isobutyl ketone; ethers of low freezing point, such as diethyl ether, ethyl n-propyl ether and tetrahydrofuran; alcohols of low freezing point, such as methanol, ethanol and isopropyl alcohol; and other normally liquid compounds of low freezing point, such as carbon disulfide. If desired, liquids of low freezing point may be obtained by the blending of two or more compound of higher freezing point. For example, mixtures of carbon tetrachloride and chloroform may be used.

In the method in which the pyrolyzed vapors are quenched to the liquid phase, below the polymerization temperature, the solution must be warmed to the desired reaction temperature, for example to a temperature above −45° C. for rapid polymerization to take place. This method is usefully employed when it is desirable to store the monomer for some period of time before polymerizing it. It is preferred, however, to carry out the polymerization reaction immediately following the pyrolysis step.

The preferred products of this process are homopolymers of the para-substituted xylyl halide pyrolysis products. However, it is also within the scope of this invention to copolymerize the pyrolysis vapors with a comonomer, such as a quinodimethane comonomer, for example, 1,4-quinodimethane, 2 - chloro - 1,4 - quinodimethane, 3-methyl-1,4-quinodimethane, 1,4 - naphthaquinodimethane and corresponding heteronitrogen derivates of these compounds containing not more than two heteronitrogen compounds each of which is vicinal to nuclear carbon atoms. When it is desirable to effect a copolymerization reaction, a comonomer is mixed with the pyrolyzed vapors in the vapor phase or the comonomer is dissolved in the solution and polymerized in accordance with the method described above in the liquid phase polymerization.

Further mixed para-xylyl halides or a mixture of para-xylene and a para-xylyl halide may be pyrolyzed and the resulting vapors cooled to yield a copolymer.

The products of this invention are polymers of xylylene and contain a minor amount of halogen. The total amount of halogen present in the homopolymer is in an amount less than 5 percent and usually not in excess of about 2.5 percent by weight on the polymer. Of this amount, usually not more than about 1 percent by weight on the polymer is removable by hydrolysis with alcoholic potassium or sodium hydroxide, this amount being presumably attached to the side chain. The remaining halogen not removable by hydrolysis must be in the aromatic nucleus. It is believed that this small amount of halogen contributes to the improved molding properties of the resulting polymer.

The following examples are offered as a better understanding of the present invention and are not to be construed as unnecessarily limiting thereto. The percent yields in the following examples are based on percent by weight of xylyl halide treated.

EXAMPLE I

Para-xylene was chlorinated at a temperature of 100° C. while being irradiated with U.V. light. The reaction was continued until the increase in weight was 90 percent of the theoretical for complete conversion of para-xylyl chloride. The product was washed and dried and fractionated to remove unreacted para-xylene and to distill off the p-xylyl chloride from higher chlorinated residues.

The vapor of the para-xylyl chloride obtained in this manner was pumped through a fused quartz pyrolysis tube of 37 mm. internal diameter and 190 cms. in length, at the rate of 640 grams/hour, the pressure in the system being 10 mm./Hg absolute. The tube was electrically heated to a temperature of 910° C. and under these conditions the residence time in the heated zone was 0.17 second. The polymer was collected together with by-products and unreacted p-xylyl chloride in a series of three condensers cooled to 20° C. with cold water, to −80° C. with solid $CO_2$ and to −195.8° C. with liquid nitrogen respectively. After removal from the condensers and extraction of by-products and unreacted material, an amount of polymer equivalent to 12.7 percent by weight of the p-xylyl chloride feed was recovered.

EXAMPLES II, III AND IV

The following examples were carried out using steam as a diluent for the para-xylyl chloride vapor. The para-xylyl chloride was prepared in a similar manner to that described in Example I and the same quartz pyrolysis tube was used. The condensing system was also similar to that of Example I. In addition to polymer, by-products, unreacted para-xylyl chloride and water containing absorbed hydrochloric acid were condensed. All the products were removed from the condensers together and the major part of the liquid condensate was separated by pressing on a filter. Residual liquid and solid by-products were removed by washing with benzene and acetone.

Details of the examples and the results are given in Table 1 below.

Table 1
[Throughput grams per hour]

| Example No. | Steam: Para-xylyl Chloride Molar Ratio | Para-xylyl Chloride | Steam | Reactor Temperature, °C. | Pressure mm. Hg Absolute | Contact Time in Seconds | Percent Conversion to Polymer |
|---|---|---|---|---|---|---|---|
| 2 | 6.2:1 | 234 | 186 | 910 | 6.0 | 0.04 | 37.9 |
| 3 | 4.5:1 | 292 | 168 | 850 | 6.0 | 0.043 | 35.7 |
| 4 | 6.7:1 | 249 | 216 | 785 | 6.5 | 0.041 | 21.9 |

It was found that the amount of unreacted para-xylyl chloride recovered increased as the reaction temperature was reduced. In Example III, the amount recovered was 10 percent by weight and in Example IV, 20 percent by weight. Samples of the polymers obtained in the examples were taken from the three different zones of condensation. Some samples were washed briefly in benzene and acetone, while other samples were exhaustively extracted for 8 hours by the same solvents, using a Soxhlet apparatus. The total chlorine contents were determined by complete analysis for carbon, hydrogen and chlorine. Hydrolyzable chlorine was determined by refluxing the finely pulverized material with an alcoholic caustic potash for 10 hours and then determining the unreacted caustic potash. The results are reported in Table 2 below. The hydrolyzable chlorine is likely to be on a side chain and the residual chlorine on the benzene ring.

Table 2.—Chlorine content of p-xylyl chloride polymer

| | Polymer Condensed at— | | |
|---|---|---|---|
| | 20° C. | −80° C. | −190° C. |
| Washed polymer, Total chlorine | Percent 2.47 | Percent | Percent 0.85 |
| Soxhlet extracted polymer, Total chlorine | 2.01 | 1.55 | 1.02 |
| Soxhlet extracted polymer, Hydrolyzable chlorine | <0.5 | <0.5 | 0.622 |

Para-xylylene polymer has been characterized by its so-called "cloud point." This is the temperature at which the polymer comes out of solution, when a solution is slowly cooled. The "cloud points" of the polymers produced in the above examples have been determined using an aromatic solvent known as "Solvent 365," and they vary between 247° C. and 249° C. Solvent 365 is an aromatic fraction boiling between 360° C. and 500° C., obtained from the cracking product of naphtha. The cloud point of p-xylylene polymer made from p-xylene as determined in the same solvent has an average value of 250° C. Therefore, there is no significant difference between para-xylylene polymer as prepared according to the present invention from p-xylyl chloride and as prepared from pure p-xylene. The advantages obtained with a xylyl chloride in preference to xylene are the increased conversion to polymer per pass, the lower reaction temperature necessary to pyrolyze the xylyl halide and the small percentage of chlorine contained in the polymer product which permits the polymer to be molded more readily at lower temperatures. For example, the polymer product of Example I is pressed into translucent sheets at temperatures between about 250° C. and about 300° C. The polymer can also be placed in a mold and molded at these temperatures.

It is to be understood that para-xylyl bromide and para-xylyl iodide can be substituted for para-xylyl chloride in any of the examples set forth above, to give high yields of the corresponding xylylene polymer containing a small amount of halogen without departing from the scope of this invention.

The polymeric products of this invention are more economically produced at lower temperatures and more efficiently obtained in higher yields. In addition, the polymers show improved molding properties over the polymers produced from para-xylene. The polymeric products of the present invention can be molded at a temperature between about 250° C. and about 300° C. into useful products such as O-rings, diaphragms, gaskets, etc. Coatings of this material display excellent electrical properties and possess good resistance to chemical attack.

Having thus described our invention, we claim:

A process which comprises pyrolyzing a para-xylyl halide, selected from the group consisting of para-xylyl chloride, para-xylyl bromide and para-xylyl iodide, at a temperature between about 500° C. and about 1000° C., polymerizing in the liquid phase in the presence of an inert solvent the resulting pyrolyzed vapors and collecting a polymer at a temperature not in excess of −45° C.

References Cited by the Examiner

UNITED STATES PATENTS

| 2,836,571 | 5/58 | Hall | 260—2 |
| 2,914,489 | 11/59 | Hall | 260—2 |

FOREIGN PATENTS

| 407,948 | 3/34 | Great Britain. |
| 517,738 | 2/40 | Great Britain. |
| 637,111 | 12/50 | Great Britain. |
| 673,651 | 6/52 | Great Britain. |

WILLIAM H. SHORT, *Primary Examiner.*

MILTON STERMAN, *Examiner.*